United States Patent
Folkert et al.

(10) Patent No.: US 7,344,195 B2
(45) Date of Patent: Mar. 18, 2008

(54) DAMPENER FOR A VEHICLE SEAT RECLINER

(75) Inventors: Mark Allyn Folkert, Farmington Hills, MI (US); Dave Williams, South Lyon, MI (US); Eric A. Woods, Allen Park, MI (US)

(73) Assignee: Lear Corporation, Southfield, MI (US)

( * ) Notice: Subject to any disclaimer, the term of this patent is extended or adjusted under 35 U.S.C. 154(b) by 387 days.

(21) Appl. No.: 11/057,284

(22) Filed: Feb. 11, 2005

(65) Prior Publication Data

US 2006/0181132 A1    Aug. 17, 2006

(51) Int. Cl.
*B60N 2/48* (2006.01)
(52) U.S. Cl. .................. 297/378.1; 297/301.4; 297/463.1; 297/301.5
(58) Field of Classification Search ............. 297/301.4, 297/378.1, 378.12, 463.1, 463.2, 301.5
See application file for complete search history.

(56) References Cited

U.S. PATENT DOCUMENTS

| | | | |
|---|---|---|---|
| 6,113,190 A * | 9/2000 | Negi et al. | 297/378.1 |
| 6,139,104 A | 10/2000 | Brewer | |
| 6,450,580 B1 * | 9/2002 | Drew et al. | 297/378.12 |
| 6,669,299 B2 | 12/2003 | Carlson et al. | |
| 6,739,668 B2 | 5/2004 | Coman et al. | |
| 6,863,347 B2 * | 3/2005 | De Nichilo | 297/378.12 |
| 2002/0135215 A1 | 9/2002 | Magyar et al. | |
| 2002/0185904 A1 | 12/2002 | Carlson et al. | |
| 2003/0025375 A1 | 2/2003 | Gray | |
| 2003/0056329 A1 | 3/2003 | Coman et al. | |
| 2004/0056523 A1 | 3/2004 | Grable et al. | |
| 2005/0015929 A1 | 1/2005 | Aufrere et al. | |

FOREIGN PATENT DOCUMENTS

| | | |
|---|---|---|
| EP | 1023486 | 3/1966 |
| EP | 1 457 704 A1 | 6/2003 |
| EP | 1 491 389 A1 | 10/2003 |
| JP | 07137564 A | 5/1995 |
| WO | WO 2004/060713 A1 | 7/2004 |

\* cited by examiner

*Primary Examiner*—Laurie K. Cranmer
(74) *Attorney, Agent, or Firm*—MacMillan, Sobanski & Todd, LLC

(57) ABSTRACT

A recliner assembly for a vehicle seat having a seat back movably mounted relative to a seat bottom includes first and second frame members. The first frame member supports the seat back. The second frame member supports the seat bottom. The first frame member is pivotally attached to the second frame member and is movable between an upright position and a storage position. In the upright position, the seat back is in a generally vertical position for supporting an occupant seated on the seat. In the storage position, the seat back is positioned above the seat bottom. A damper is operatively connected between the first and second frame members. The damper dampens the movement of the first frame member relative to the second frame member when the first frame member is pivoted from the upright position to the storage position.

18 Claims, 4 Drawing Sheets

DAMPENER FOR A VEHICLE SEAT RECLINER

BACKGROUND OF THE INVENTION

This invention relates in general to vehicle seats, and in particular to a recliner mechanism for a vehicle seat.

Virtually all vehicles, such as automobiles and other passenger vehicles employ seats in the interior compartment of the vehicles. The seats are useful to support passengers being transported in the vehicles in relative safety and comfort. The seats are often positioned in rows, most passenger vehicles having two or three rows of seats. Some passenger vehicles, such as vans and sport utility-type vehicles, include multiple rows of seating within the interior of the vehicle. Often, these vehicles include a first or front row of seats for a driver and passenger, and one or more rows of rear seats behind the front row. The seats generally include a generally horizontal seat bottom and a seat back extending generally vertically upward from the seat bottom.

It is generally desirable to temporarily remove the rear seats or position the rear seats into a storage position to create more cargo room in the interior of the vehicle. For example, some rear seats have seat backs which are pivotally mounted relative to the seat bottom. The seat backs can be pivoted forwardly to a storage position so that the seat back is in a generally horizontal position resting above the seat bottom. Typically, the seats includes a latch mechanism to maintain the seat back in its upright position. To move the seat back to its storage position, a handle is typically operated releasing the latch mechanism and permitting the seat back to pivot forwardly to its storage position. To assist in pivoting the seat back to its storage position, the seat can include a spring connected between the seat bottom and seat back which biases the seat back to its storage position. Thus, when the handle is operated to release the latch mechanism, the spring will automatically pivot the seat back from the upright position to the storage position.

It is also becoming increasingly more common in passenger vehicles, such as sport utility vehicles and mini-vans, to include a third row seat or seats. Commonly, the vehicle includes a pair of front doors and a pair of rear doors located adjacent the front and second row of seats, respectively. The third row seat is commonly located at the generally furthermost rear portion of the vehicle and is not located adjacent a door opening. Thus, passengers do not have direct access to the third row seat. To provide access to the third row seat or a rear storage area, it is known to have one or more of the second row seat assemblies movable to a forwardly folded position adjacent the front row of seats. The second row seat assembly is folded such that the seat back is first folded downwardly on top of the seat bottom, and then both are pivoted about a pivot point at a lower front edge of the seat bottom to approximately 90 degrees. The seat back of the second row seat assembly will then be positioned between the seat bottom and the seat back of the front row seat. The passenger can then enter the vehicle via one of the rear doors, and slip past the folded second row seat assembly, thereby permitting access to the third row seat. To assist in pivoting the seat back to its storage position and or folded position, the seat can also include a spring connected between the seat bottom and seat back which biases the seat back to its storage position.

For both of the above described circumstances when it is desired to move the seat back from its upright position to at least a storage position resting above the seat bottom, the spring is utilized to automatically pivot the seat back so that the operator of the seat does not have to manually move the seat back. In some cases, the spring force generated by the spring must be relatively high to overcome the weight of the seat back and/or the frictional forces of the recliner mechanism. Due to this large spring force and relatively fast motion of the seat back, the seat back may bounce back upwards once it initially contacts the seat bottom due to the inherent springiness of the cushions of the seat back and seat bottom. Although the relatively large spring force may be required to adequately move the seat back, this bounce back is generally undesirable by the consumers of the vehicle.

BRIEF SUMMARY OF THE INVENTION

This invention relates in general to vehicle seats, and in particular to a recliner mechanism for a vehicle seat having a dampener which dampens the movement of the seat back of the seat when pivoted from an upright position to a folded storage position.

The recliner assembly of the invention includes first and second frame members. The first frame member supports a seat back. The second frame member supports a seat bottom. The first frame member is pivotally attached to the second frame member and is movable between an upright position and a storage position. In the upright position, the seat back is in a generally vertical position for supporting an occupant seated on the seat. In the storage position, the seat back is positioned above the seat bottom. A damper is operatively connected between the first and second frame members. The damper dampens the movement of the first frame member relative to the second frame member when the first frame member is pivoted from the upright position to the storage position.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a cross-sectional view of a portion of recliner assembly taken along lines 5-5 of FIG. 3.

FIG. 6 is a cross-sectional view of a portion of recliner assembly taken along lines 6-6 of FIG. 4.

DETAILED DESCRIPTION OF THE INVENTION

Preliminarily, it should be noted that certain terms used herein, such as "upper", "lower", "top", "bottom", "front", "back", "backward", "forward", "left", "right", "height", "width", "length", and "side", are used to facilitate the description of the preferred embodiment of the invention. Unless otherwise specified or made apparent by the context of the discussion, such terms should be interpreted with reference to the figure under discussion. Such terms are not intended as a limitation on the position in which the components of the invention may be used. Indeed, it is contemplated that the components of the invention may be easily positioned in any desired orientation.

Figure 1:
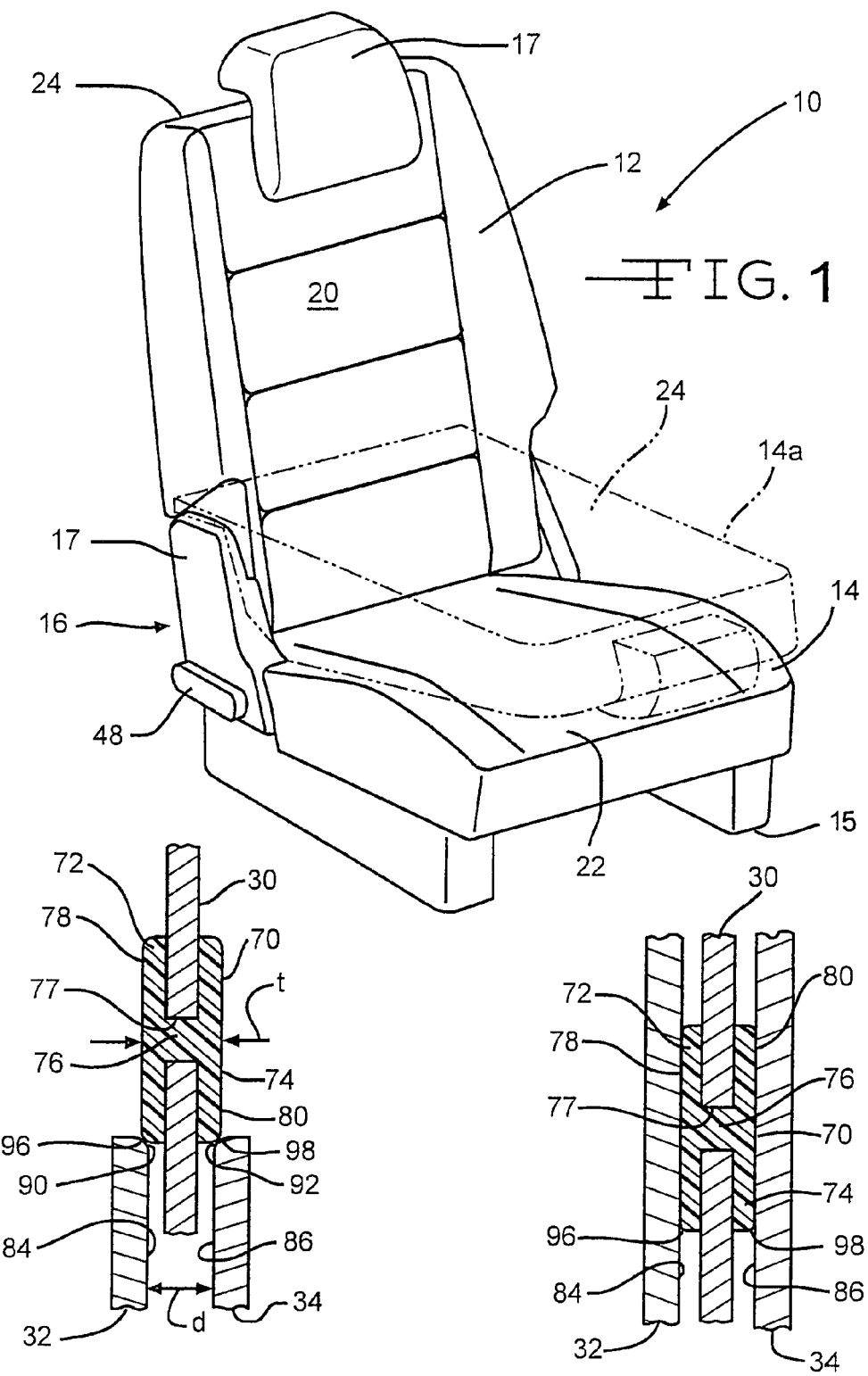
FIG. 1 is a perspective view of a vehicle seat having a recliner assembly in accordance with the present invention, wherein the seat back is illustrated in its upright position as shown in solid lines, and in its storage position represented by broken lines

Referring now to the drawings, there is illustrated in FIG. 1 a vehicle seat, indicated generally at 10. The seat 10 generally includes a seat back 12, and seat bottom 14, and a base or adjuster assembly 15. The seat back 12 can also include a headrest 17 which may be movably mounted on the seat back 12. The adjuster assembly 15 mounts the seat 10 to the floor of a vehicle, and if desired can include adjuster mechanisms for providing fore and aft adjustment of the seat 10 relative to the floor. The adjuster assembly 15 may also provide vertical adjustment of the seat 10 relative to the floor.

The seat back 12 is pivotally mounted on the seat bottom 14 by a recliner assembly, indicated generally at 16. Note that the recliner assembly 16 is covered by a recliner trim cover 17. It should be understood that the recliner assembly 16 of the present invention can be used as a single recliner on one side only of the vehicle seat 10 or can include a pair of recliner assemblies 16 used on each side of the seat 10. As will be described in detail below, the seat back 12 is pivotable between an upright position, as shown in solid lines in FIG. 1, for supporting an occupant seated on the seat 10, and a storage position, as represented by broken lines 14a in FIG. 1. In the storage position, a front surface 20 of the seat back 12 is positioned above and may rest on an upper surface 22 of the seat bottom 14. When the seat back 12 is in the storage position, a rear surface 24 of the seat back 12 is in a generally horizontal plane and can be used as a flat load floor for the storage of cargo thereon. The flat load floor of the seat 10 can be used in cooperation with other seats and structures of the vehicle to create a large flat load floor in the vehicle.

There is illustrated in FIGS. 2-5, an enlarged view of the recliner assembly 16. The recliner assembly 16 includes an upper member or plate 30, a first lower member or plate 32, and a second lower member or plate 34. The upper plate 30 is pivotally attached to the first and second lower plates 32 and 34 at a pivot axis A. Preferably, the upper plate 30 is disposed between the lower plates 32 and 34. The plates 30, 32, and 34 can be pivotally attached together by any suitable means, such as by a pivot pin structure or a rivet. The plates 30, 32, and 34 are preferably made of metal to providing adequate strength for the recliner assembly 16. In the embodiment shown, the plates 30, 32, and 34 are relatively thin components, preferably formed from a stamped metal piece. Although the plates 30, 32, and 34 are generally shown and described as relative thin flat members, it should be understood that the plates 30, 32, and 34 can have any suitable configuration.

The upper plate 30 is attached to a frame member 36 for supporting the seat back 12. The frame member 36 can be any suitable structure and shaped for proper support of the seat back 12. For example, the frame member 36 can include a pair of elongated spaced apart generally vertical side members connected together by an upper and lower cross member. The lower plates 32 and 34 are spaced apart from one another and may be connected together at lower portions thereof. The plates 32 and 34 are attached to a frame member 40 for supporting the seat bottom 14. The frame member 40 can be any suitable structure and shape for proper support of the seat bottom 14.

The recliner assembly 16 preferably includes a latch mechanism, indicated schematically at 46. The latch mechanism 46 is conventional in the art, and selectively rotationally latches the seat back 12 relative to the seat bottom 14 to prevent pivoting thereof. For example, the latch mechanism 46 is operable to maintain the seat back 12 in its upright position, and can be operated to release the seat back 12 from the seat bottom 14 so that the seat back 12 may be moved or pivoted forward towards its storage position. If desired, the latch mechanism 46 may also latch the seat back 12 in its storage position. A handle 48 located on the side of the seat 10 may be manually operated by the seat occupant to actuate the latch mechanism 46. Also, a strap (not shown) may be connected to the latch mechanism 46 and manually operated to actuate the latch mechanism 46. The end of the strap can be directed to any suitable area, such as the rear of the seat 10 so that it can be used by persons not able to reach the handle 48.

The recliner assembly 16 preferably includes spring 60 to assist in automatically pivoting the seat back 12 from its upright position to its storage position. The spring 60 is utilized to automatically pivot the seat back 12 so that the operator of the seat 10 does not have to manually move the seat back 12 to its storage position. The spring 60 can be any suitable spring which is operatively connected between the plate 30 and the plates 32 and 24 which biases the plate 30 in a generally clockwise direction, as viewing FIGS. 2-4. In the embodiment illustrated, the spring 60 is a coiled power or spiral spring. One end 62 of the spring 60 is connected to the upper plate 30 such as by a pin 63, and the other end 64 of the spring 60 is connected to one of the lower plates 32 and 34 such as by a mounting structure 65 formed on the lower plate 32. When it is desired to move the seat back 12 from its upright position to the storage position resting above the seat bottom 14, the latch mechanism 46 is released. The spring 60 then biases the upper plate 30 to rotate in the clockwise rotation, thereby pivoting the frame member 36 and the seat back 12.

To prevent the seat back 12 from pivoting too forcefully and rapidly, the recliner assembly 16 preferably includes at least one dampener 70, in accordance with the present invention. The dampener 70 dampens the movement of the seat back 12, or its frame member 36, relative to the seat bottom 14 when the seat back 12 is moved from its upright position to its storage position. The dampener 70 dampens this motion by reducing the velocity or acceleration of the seat back 12 as it approaches the seat bottom 14. This helps prevent the seat back 12 from bouncing back upwards once it initially contacts the seat bottom 14. This dampening motion is particularly useful for seats having a relatively high spring force which may be required to adequately move the seat back to its storage position.

Figure 2:
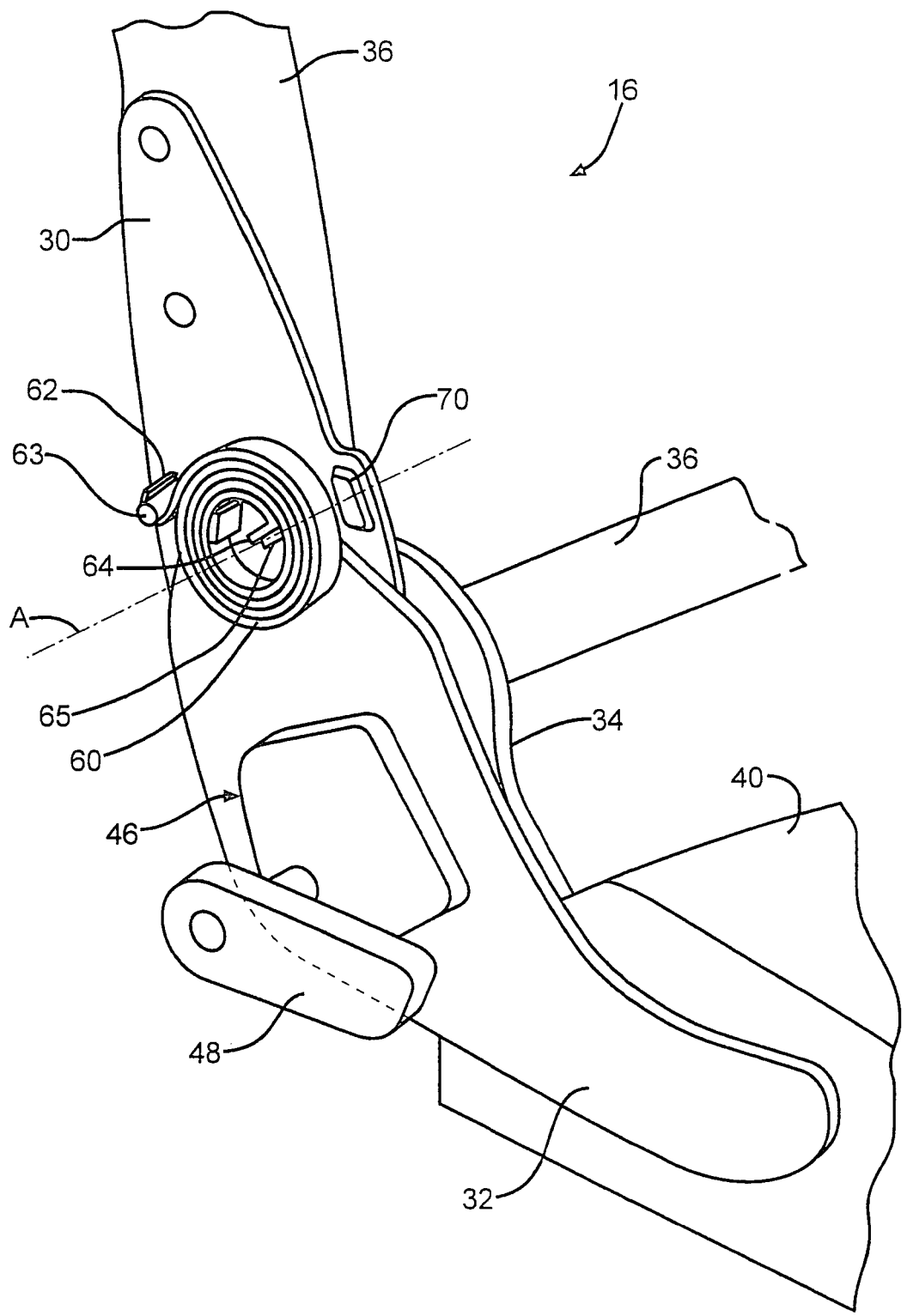
FIG. 2 is an enlarged perspective view of the recliner assembly shown in its fully upright position.

The dampener 70 is preferably a relatively rigid or solid member mounted on one of the plates 30, 32, and 34 which frictionally engages the other of the plates 30, 32, and 34 during rotational movement therebetween. As best shown in FIGS. 2 5, and 6 the dampener 70 is a plastic member which is attached onto the upper plate 30. It has been found that a plastic material, such as polyacetal sold under the Tradename Delrin manufactured by DuPont. Preferably, the dampener 70 is molded onto the metal plate 30 to provide a secure attachment, and thus is fixed relative to the plate 30.

As shown in FIGS. 5 and 6, the dampener 70 includes a first portion 72 and a second portion 74 joined together by a web portion 76. The web portion 76 extends through an aperture 77 formed through the upper plate 30. Note that the cross-sectional area of the aperture 77 is less than the cross-sectional area of the first and second portions 72 and 74 such that the dampener 70 is trapped onto the upper plate 30. The first portion 72 defines a first dampening surface 78.

The second portion 72 defines a second dampening surface 80. As will be described below, when the dampener engages the plates 32 and 34 during travel of the seat back 12, the first dampening surface 78 of the dampener 70 slidingly frictionally engages a sliding surface 84 of the first lower plate 32. Similarly, the second dampening surface 80 of the dampener 70 slidingly frictionally engages a sliding surface 86 of the second lower plate 34.

The operation of the dampener 70 will now be discussed. As shown in FIG. 2, the recliner assembly 16 is illustrated such that the seat back 12 is in its upright position, which for the embodiment of the seat 10 illustrated in FIGS. 1-5 is about 103 degrees from the horizontal. Thus, the seat back 12 has a general recline angle of about 13 degrees from the vertical. Please note that throughout the specification and claims, the term "generally vertical position" when referring to the position of the seat back 12 refers to this inclined angle as shown in FIG. 2. Thus, the term "generally vertical position" does not specifically suggest a 90 degree vertical orientation with respect to the horizontal, but rather a typical orientation for supporting an occupant seat thereon. As shown in FIG. 2, the dampener 70 is mounted on the upper plate 30 such that it is fully exposed and is not in contact with either of the sliding surfaces 84 and 86 of the lower plates 72 and 74, respectively.

Figure 3:
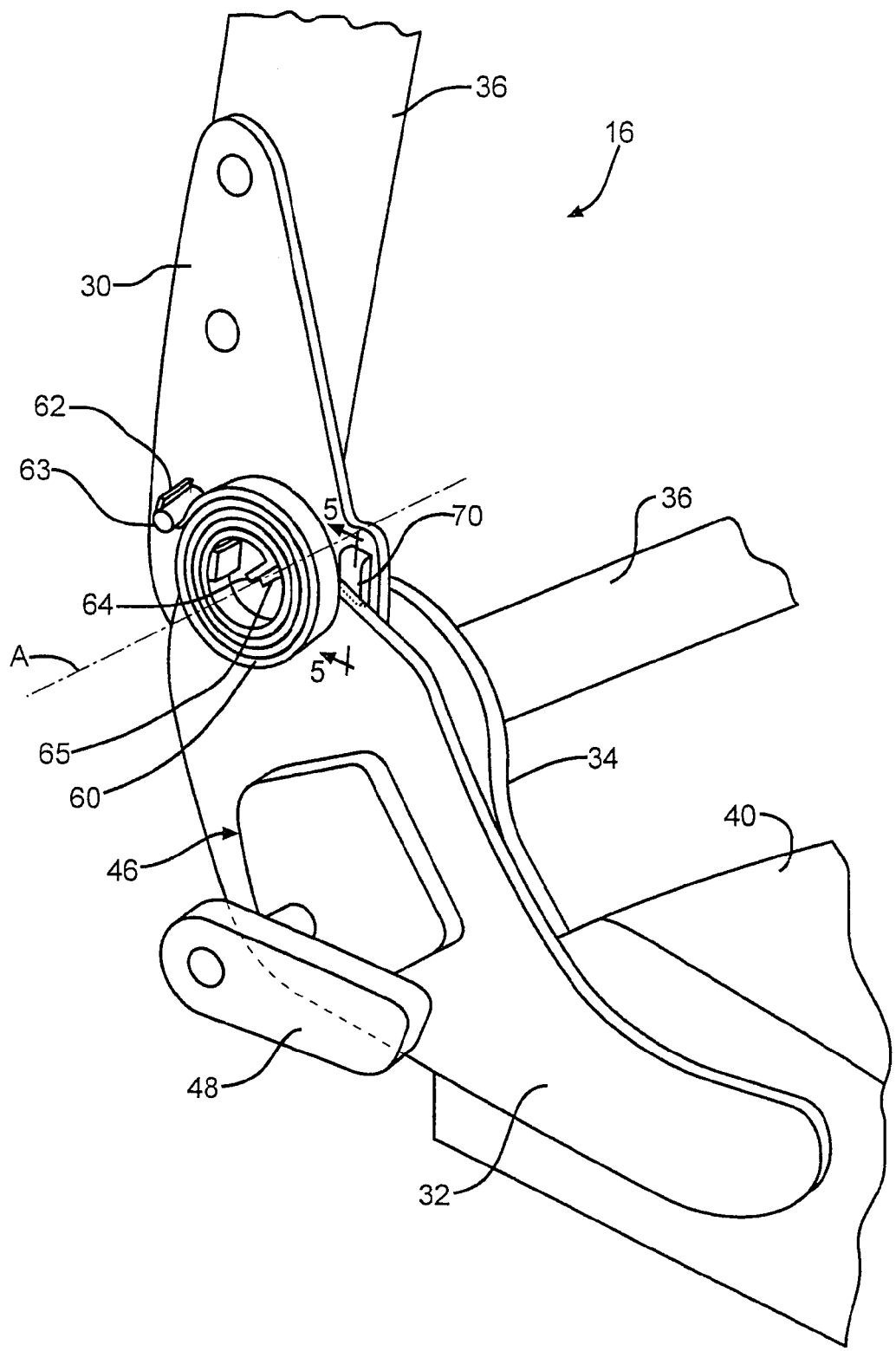
FIG. 3 is an enlarged perspective view of the recliner assembly shown in an intermediate position.
Figure 4:
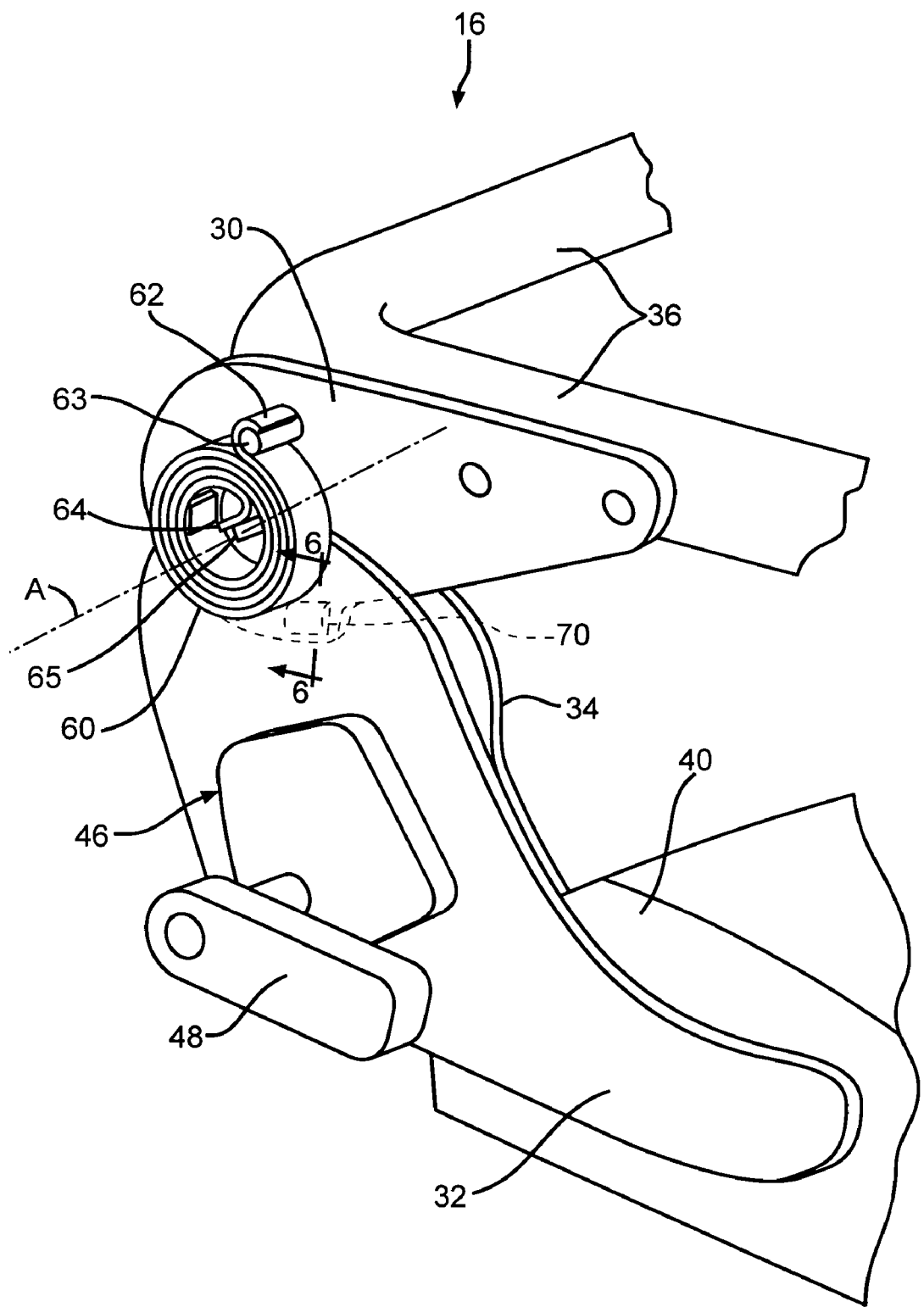
FIG. 4 is an enlarged perspective view of the recliner assembly shown in its storage position.

To move the seat from its upright position to its storage position, the latch mechanism 46 is actuated to permit the rotational movement of the seat back 12 relative to the seat bottom 14. The force of the spring 60 propels the seat back 12 forward in a clockwise rotational direction when viewing FIG. 2. When the seat back 12 is pivoted about 18 degrees from the upright position, as shown in FIG. 3, the dampener 70 is moved between the lower plates 72 and 74 and initial engagement occurs between the dampener 70 and the lower plates 72 and 74. Specifically, the dampening surface 78 of the first portion 72 of the dampener 70 initially engages the sliding surface 84 of the first lower plate 72. Also, preferably simultaneously, the dampening surface 80 of the second portion 74 initially engages the sliding surface 86 of the second lower plate 74.

As best shown in FIG. 5, the sliding surfaces 84 and 86 are preferably spaced apart from one another by a distance "d" when the seat back 12 is in its upright position, or just prior to initial engagement of the dampener with the plates 32 and 34. As also shown in FIG. 5, the thickness of the dampener 70, which corresponds to the distance between the dampening surfaces 78 and 89 is designated as thickness "t". Preferably, the recliner mechanism is configured such that an interference fit exists between the dampener 70 and the lower plates 32 and 34 such that the thickness "t" is slightly greater than the distance "d" (greatly exaggerated at FIGS. 5 and 6 for clarity purposes). It has been found that a difference of less than 1.0 mm is sufficient. Further rotational movement of the upper plate 30 relative to the lower plates 32 and 34 will cause frictional sliding engagement between the dampener 70 and the lower plates 32 and 34. Specifically, further rotational movement will cause frictional sliding engagement between the dampening surface 78 of the first portion 72 of the dampener 70 with the sliding surface 84 of the first lower plate 72. Also, further rotational movement will cause frictional sliding engagement between the dampening surface 80 of the second portion 74 of the dampener 70 with the sliding surface 86 of the second lower plate 34. This sliding frictional engagement dampens the movement of the seat back 12 relative to the seat bottom 14. Preferably, the frictional engagement reduces the velocity and/or acceleration of the seat back 12 so that the seat back does not undesirably hit the seat bottom 14 at a high velocity so as to bounce back up in a reverse rotational direction by an undesirable amount. Of course, the frictional engagement must also not be so great as to prevent the seat back 12 from moving to its storage position when so desired.

Further rotational movement of the upper plate 30 relative to the lower plates 32 and 34 will cause the dampener 70 to fully engage the lower plates 32 and 34, such as shown in FIG. 6, continuing the sliding frictional engagement between the dampener 70 and the lower plates 32 and 34. Since the thickness t of the dampener 70 is slightly greater than the distance d between the plates 32 and 34, this further rotational movement of the dampener will cause the plates 32 and 34 to slightly flex outwardly to accommodate the dampener 70. This slight deformation of the plates 32 and 34, and also possible deformation of the dampener causes an increased force to act against the frictionally engaged surfaces, 78, 84 and 80, 86 thereby altering the frictional forces therebetween.

Preferably, the lower plates 32 and 34 have curved edges 90 and 92 formed therein so that the dampener 70 is guided relatively smoothly against the surfaces 84 and 86 of the plates 32 and 34 instead of forcefully hitting a sharp edge, which may cause excessive wear on the recliner assembly 16 leading to a shortened useful life. The curved edges define a radius, as shown in FIGS. 5 and 6, which functions as a ramped surface to guide the dampener 70 against the plates 32 and 34. The curved edges 90 and 92 can be formed by a coining operation, as is well known in the art, after or during formation of the plates 30 and 32. Preferably, the dampener 70 also includes rounded edges 96 and 98 for this same reason.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A recliner assembly for a vehicle seat having a seat back movably mounted relative to a seat bottom, said recliner assembly comprising:
    a first frame member for supporting a seat back;
    a second frame member for supporting a seat bottom, said first frame member pivotally attached to said second frame member and movable between an upright position wherein the seat back is in a generally vertical position for supporting an occupant seated on the seat, and a storage position wherein the seat back is positioned above the seat bottom; and
    a damper operatively connected between said first and second frame members, said damper including first and second plates that are respectively connected to said first and second frame members and that slidably cooperate to dampen movement of said first frame member relative to said second frame member during only a portion of the movement from said upright position to said storage position.

2. The recliner assembly of claim 1, wherein said recliner assembly further includes a spring member connected between said first and second frame members such that said spring member biases the seat back to its storage position.

3. The recliner assembly of claim 2, wherein said spring member is a spiral spring.

4. The recliner assembly of claim 1, wherein said damper utilizes sliding frictional engagement between two surfaces to provide the dampening movement of said first frame member relative to said second frame member.

5. The recliner assembly of claim 4, wherein said damper includes a dampener operatively connected to one of said first and second plates.

6. The recliner assembly of claim 5, further including a third plate that is fixed in position relative to said second plate, and wherein said dampener includes a pair of dampening surfaces which frictionally engage a pair of sliding surfaces of said second and third plates.

7. The recliner assembly of claim 6, wherein said dampening surfaces are formed on opposed sides of said dampener.

8. The recliner assembly of claim 5, wherein said dampener is made of plastic.

9. The recliner assembly of claim 5, wherein said dampener is operatively connected to one of said first and second plates and is in selective sliding frictional engagement with the other one of said first and second plates.

10. The recliner assembly of claim 9, wherein said dampener is molded onto said one of said first and second plates.

11. The recliner assembly of claim 9, wherein said dampener is fastened to one of said first and second plates, and wherein said other of one of said first and second plates includes a third plate having said sliding surface in selective sliding engagement with said dampener.

12. The recliner assembly of claim 11, wherein said dampener extends outwardly from said first plate, and wherein said third plate is spaced from said second plate by a distance less than the width of the dampener such that an interference fit exists between said second and third plates and said dampener.

13. The recliner assembly of claim 12, wherein each of said second and third plates includes a coined edge defining a radius.

14. The recliner assembly of claim 12, wherein said dampener includes a rounded edge defining a radius.

15. A seat assembly comprising:

a first frame member for supporting a seat back;

a second frame member for supporting a seat bottom, said first frame member supported on said second frame member for movement between first and second positions relative thereto; and a damper including first and second plates that are respectively fixed in position relative to said first and second frame members, said first plate slidably cooperating with said second plate during only a portion of the movement of said first member from said first position to said second position relative to said second member.

16. The seat assembly of claim 15, further including a dampener supported on one of said first and second plates, said dampener slidably cooperating with the other of said first and second plates during only a portion of the movement of said first member from said first position to said second position relative to said second member.

17. The seat assembly of claim 15, further including a third plate that is fixed in position relative to said second plate, said first plate slidably cooperating with said second and third plates during only a portion of the movement of said first member from said first position to said second position relative to said second member.

18. The seat assembly of claim 17, further including a dampener supported on said first plate, said dampener slidably cooperating with said second and third plates during only a portion of the movement of said first member from said first position to said second position relative to said second member.

* * * * *